United States Patent [19]

Guers et al.

[11] Patent Number: 4,732,494
[45] Date of Patent: Mar. 22, 1988

[54] BEARING OR ROLLER BEARING WITH DATA SENSOR

[75] Inventors: Roger Guers, Seynod; Georges Godard, Poisy Chef Lieu, both of France

[73] Assignee: S. N. R. Roulements, Annecy, France

[21] Appl. No.: 914,478

[22] Filed: Oct. 1, 1986

[30] Foreign Application Priority Data

Jun. 10, 1986 [FR] France .................................. 86 08348

[51] Int. Cl.⁴ .......................... F16C 32/00; G01B 7/14
[52] U.S. Cl. .................................... 384/448; 384/446; 324/208
[58] Field of Search ...................... 384/8, 91, 446, 448, 384/624, 133; 324/207, 208, 251, 252, 260–262, 226, 227; 338/32 R, 32 H

[56] References Cited

U.S. PATENT DOCUMENTS

| 3,573,520 | 4/1971 | Dorshimer | 310/168 |
| 3,742,243 | 6/1973 | Gamble | 324/171 |
| 4,167,734 | 9/1979 | Logan | 384/624 X |
| 4,259,637 | 3/1981 | Bloomfield et al. | 324/208 X |
| 4,319,188 | 3/1982 | Ito et al. | 324/208 X |
| 4,646,088 | 2/1987 | Inoue | 324/207 X |
| 4,656,377 | 4/1987 | Akiyama | 324/208 X |

FOREIGN PATENT DOCUMENTS

| 0073903 | 3/1983 | European Pat. Off. . |
| 975788 | 9/1962 | Fed. Rep. of Germany . |
| 2935965 | 12/1981 | Fed. Rep. of Germany . |
| 2058704 | 5/1971 | France . |
| 2558223 | 7/1985 | France ................................ 384/624 |
| 2565045 | 11/1985 | France . |
| 2568377 | 1/1986 | France . |
| 2574501 | 6/1986 | France . |
| 1353306 | 5/1974 | United Kingdom . |
| 1509170 | 4/1978 | United Kingdom . |

Primary Examiner—John M. Jillions
Assistant Examiner—Thomas R. Hannon
Attorney, Agent, or Firm—Oblon, Fisher, Spivak, McClelland & Maier

[57] ABSTRACT

Bearing or roller bearing with data sensor of the type having a stationary element carrying a magnetic field sensor device and a rotating element carrying at least one multipole magnetized ring placed coaxially with the rotating element and separated from the sensor device by a gap.

15 Claims, 9 Drawing Figures

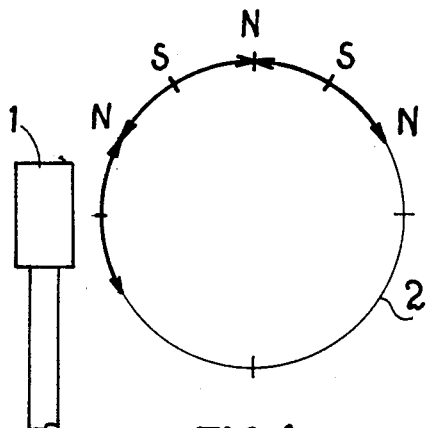
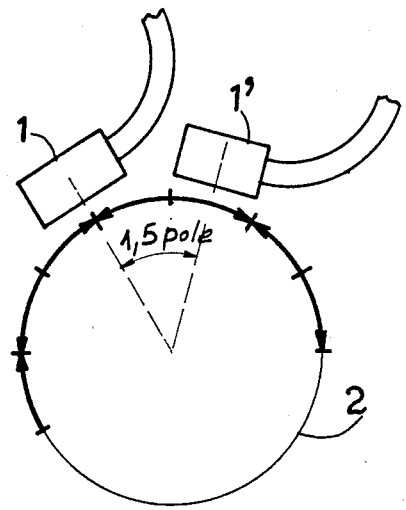
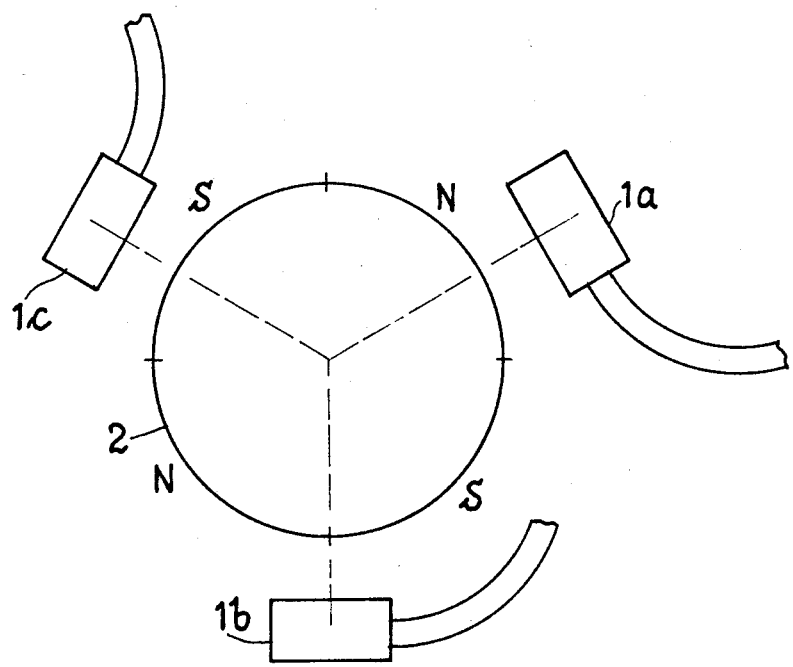
FIG.1
FIG.2a
FIG.2b

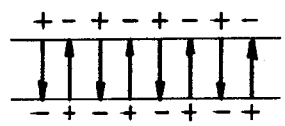
FIG.3
FIG.4
FIG.5
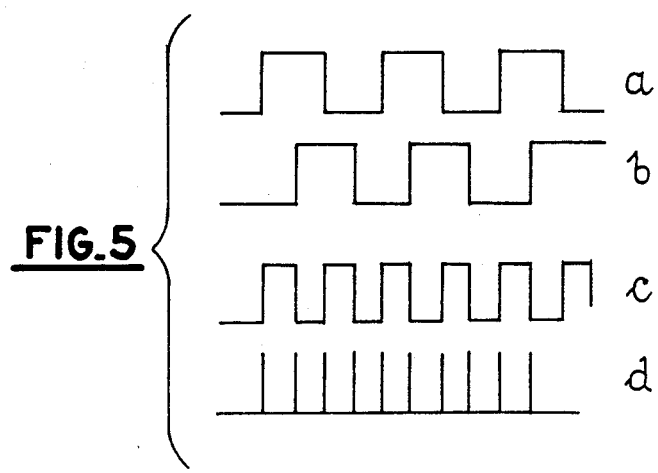

BEARING OR ROLLER BEARING WITH DATA SENSOR

BACKGROUND OF THE INVENTION

1. Field of the Invention

The invention relates to a bearing or roller bearing with data sensing of the type comprising a stationary element carrying a data sensor device and a rotating element carrying a magnet.

2. Background of the Related Art

The development of automatic operations now requires the exact measurement of the speed and angle of rotation of mechanical elements. A device is known from French published Patent Application FR-A-No. 2 565 045 for the detection of the anglular position of a rotor. It consists of a disk mounted coaxially on a revolving shaft and having a radial face to which are fastened permanent magnets of alternatingly reversed polarity for producing a magnetic field, and Hall-effect proximity sensors placed in the vicinity of the radial face and carried by a portion of the stator coaxial with the revolving shaft, the sensors being angularly adjustable and able to detect the axial component of said field.

French published Patent Application FR-A-No. 2 568 377 similarly describes a rotating machine speed sensor.

When such a device is mounted in a rotating machine, however, its operation can be disturbed by magnetic field induced in the stator or in the rotor.

The lack of precision in assembling the machine, coupled with the ability of the magnets to produce relatively strong fields (several hundred gauss), at times causes the magnet to disturb the environment or pick up metal particles.

The integration of the elements directly into a rotating machine would lead to products usable in a broad temperature range ($-40°$ to $+150°$ C.) which would eliminate the need for numerous traditional components.

SUMMARY OF THE INVENTION

The invention therefore has as its object the provision of a tachometer assembly for measuring the speed of rotation of a rotating element or of a device for detecting the angular position of a bearing or roller bearing element.

According to the invention, the rotating element carries at least one multipole magnet centered ring coaxially with the rotating element and separated from the sensor by a gap.

The device thus achieved can easily be integrated into a bearing or roller bearing whose elements have a good mechanical precision and sufficient protection from outside agents to give the sensor the necessary reliability.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein:

FIG. 1 is a schematic view of a ring with curved magnets associated with a sensor, according to the invention;

Figure 6:
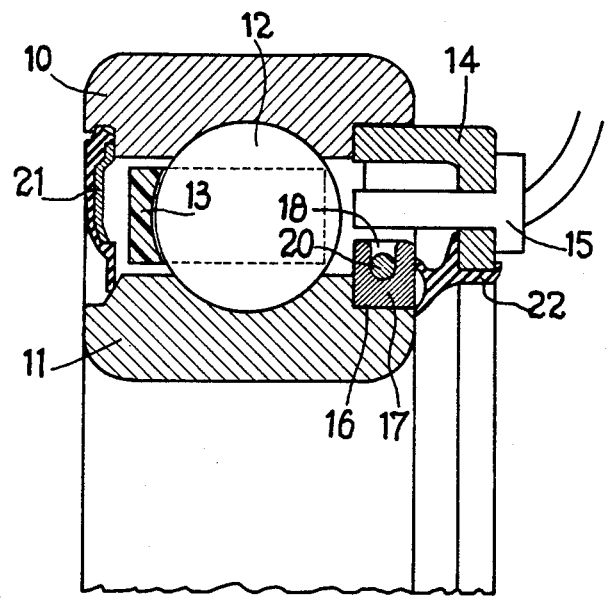
Figure 7:
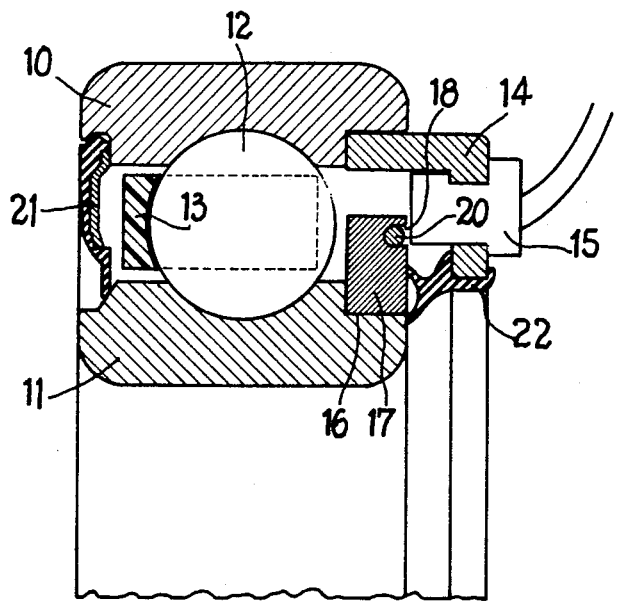
Figure 8:
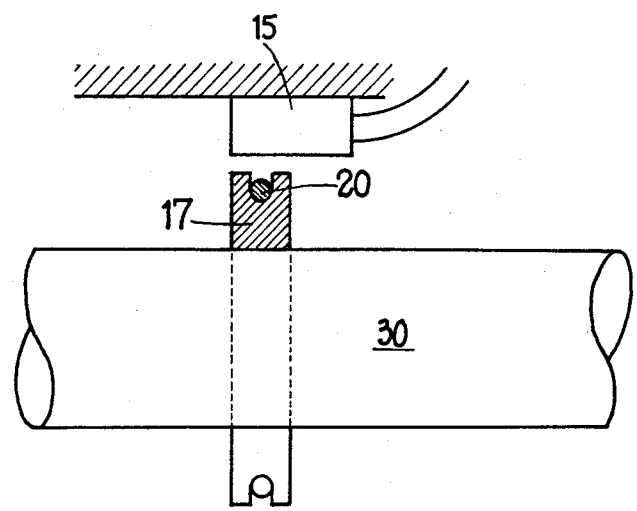

FIG. $2_a$ is a schematic view of a ring with curved magnets associated with two sensors, according to the invention;

FIG. $2_b$ is a schematic view of a ring of curved magnets associated with 3 sensors to obtain a device for detecting angular position, according to the invention;

FIG. 3 is a schematic view of a section of the ring of the invention formed of straight magnets;

FIG. 4 is a schematic representation of the signals obtained with the magnet-sensor combination of FIG. 1;

FIG. 5 is a schematic representation of elementary and resulting signals obtained with the magnet-sensor combination of FIG. $2_a$;

FIGS. 6 and 7 are views in axial section of a roller bearing whose inside ring carries a magnet ring and whose outside ring carries at least one sensor, according to the invention; and FIG. 8 is a schematic view of a shaft carrying the magnet ring rotating in front of a sensor fixed to a stationary housing.

DETAILED DESCRIPTION OF THE PREFERRED EMBODIMENTS

FIG. 1 schematically illustrates a magnet field magnet-sensor unit. The unit includes a Hall-effect proximity sensor 1 or magnetoresistor, with incorporated processing electronics and digital output, operating in a temperature range of $-40°$ to $+150°$ C.

The sensor 1 is sensitive to weak magnetic fields (about 20 to 30 gauss) and delivers a signal whose sign is reversed when a magnetic field parameter is exceeded or altered, for example, by a change of direction of the magnetic field.

The sensitivity of the sensor allows the use of a multipole magnetic ring 2 with a weak coercive field (some hundreds of Oersteds) formed, by way of example, as a circumferentially split toric ring made of abutting segments of magnetically treated alloy of iron, chromium, cobalt, vanadium, etc.

By way of example, the ring may be formed from a curved magnetized wire 1 mm in diameter, which has multiple magnetized multipole portions abutting one another and allows its use in a temperature range of $-50°$ to $+200°$ C. under the severe conditions of use experienced by the mechanical assemblies to which it is connected. The wire has opposite poles abutting end to end so that the polarity of the ring reverses at the ends of each magnet sector. The ring 2 may also be formed of straight radially extending magnetic portions with alternating polarity, as shown in FIG. 3.

The distribution of the magnetic field in FIG. 1 may be provided by forming the ring of discrete curved magnets 4 to 7 mm in length, for example. The resulting signal is shown in FIG. 4.

FIG. $2_a$ schematically shows the operation of a unit whose magnetic ring 2 is associated with two sensors 1, 1' which are angularly spaced by an interval of n+0.5n, in which n is the length of a particular magnet or magnetic segment. The obtained signals are respectively shown as a and b in FIG. 5.

This arrangement makes it possible to double the number of output signals and to detect the failure of operation of one of the sensors by observing a change in the signals delivered.

This arrangement of the sensors, which results in the electrical signals a and b from the two sensors 1 and 1' being 90° out of phase, also makes possible the detection of the direction of rotation.

By using the various leading and trailing edges of the signals, it is possible to obtain a multiplication by 2 of the number of pulses per rotation (shown as c or d in FIG. 5).

FIG. $2_b$ schematically shows a curved ring 2 associated with 3 sensors $1_a$, $1_b$, $1_c$ to achieve an angular position detector applicable, by way of example, to electronic switching of rotating machines.

FIGS. 6 and 7 are views in section of a ball bearing which has an outside first ring 10 and an inside second ring 11 which are able to be stationary or rotate, as desired, as a functon of use.

Rings 10 and 11 have tracks for rotating bodies 12 placed in a cage 13 which assures their rentention and angular position.

Outside ring 10, assumed to be stationary, carries a seal 21 with a radial lip in contact with inside ring 11 and a deflector 14 to which a sensor 15 of the type described above is fastened.

Inside ring 11, assumed to be rotating, has a bearing surface 16 to which is non-rotatably mounted a ring 17 of nonmagnetic material, retained by gluing, force fitting or any other means. Ring 17 has a groove 18 whose radial opening (FIG. 6) or axial opening (FIG. 7) is separated from sensor 15 by a gap between 0.1 and 1.5 mm, the gap determined as a function of the size of the roller bearing.

In groove 18 is positioned a split magnetic ring 20, formed of a magnetic metal alloy wire, as described above.

Standard seal 21 is fitted into a groove in ring 10 and standard seal 22 is mounted in a hooking edge of deflector 14. Seal 22 and deflector 14 thus assure the protection of the sensor from outside agents.

Seals 21, 22 are respectively provided with radial and axial tight lips in rubbing contact on rotating ring 11 and/or on magnet-carrying ring 17.

The proposed sensor-magnet arrangement thus does not create any detectable magnetic field in the roller bearing and conversely the steel structure of the roller bearing protects the arrangement from outside spurious magnetic fields.

FIG. 8 illustrates the sensor-magnet arrangement intended to measure the speed of rotation of a rotating shaft 30.

Magnet-carrying ring 17 in this case is rigidly fastened to shaft 30 and rotates in front of the sensor device mounted on a housing.

This type of assembly is applicable to units using small-sized bearings or roller bearings, which does not allow use of the assemblies shown in FIGS. 6, 7, and which are encountered in the household electronics industry.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A bearing having a sensor, comprising:
   a first annular bearing element;
   a second annular bearing element which is rotatable relative to said first bearing element;
   a continuous magnetic wire ring rotatable coaxially with said second bearing element, a circumference of said ring defining multiple magnetized portions with circumferentially alternating north and south poles; and
   a magnetic sensor fixed to said first bearing element and spaced from said ring by a predetermined gap.

2. The bearing of claim 1, wherein said sensor comprises at least one Hall-effect proximity sensor including processing electronics and digital output means.

3. The bearing of claim 2 wherein said ring is formed of a magnetized alloy having a main component taken from the group consisting of iron, cobalt, chromium and vanadium.

4. The bearing of claim 3 including a non-magnetic ring supporting said magnetic ring, wherein said predetermined gap is between 0.1 mm and 1.5 mm.

5. The bearing of claim 4 wherein said first and second bearing elements comprise roller bearing rings and including a deflector fixed to said first bearing element and supporting said sensor.

6. The bearing of claim 5 wherein said deflector supports a bearing seal.

7. The bearing of claim 1, wherein said sensor comprises at least one magnetoresistor proximity sensor including processing electronics and digital output means.

8. The bearing of claim 7 wherein said ring is formed of a magnetized alloy having a main component taken from the group consisting of iron, cobalt, chromium and vanadium.

9. The bearing of claim 8 including a non-magnetic ring supporting said magnetic ring, wherein said predetermined gap is between 0.1 mm and 1.5 mm.

10. The bearing of claim 9 wherein said first and second bearing elements comprise roller bearing rings and including a deflector fixed to said first bearing element and supporting said sensor.

11. The bearing of claim 10 wherein said deflector supports a bearing seal.

12. The bearing of claim 1 wherein said ring is formed of a magnetized alloy having a main component taken from the group consisting of iron, cobalt, chromium and vanadium.

13. The bearing of claim 12 including a nonmagnetic ring supporting said magnetic ring, wherein said predetermined gap is between 0.1 mm and 1.5 mm.

14. The bearing of claim 13 wherein said first and second bearing elements comprise roller bearing rings and including a deflector fixed to said first bearing element and supporting said sensor.

15. The bearing of claim 14 wherein said deflector supports a bearing seal.

* * * * *